(12) United States Patent
Leiber

(10) Patent No.: US 11,221,062 B2
(45) Date of Patent: Jan. 11, 2022

(54) HELICAL GEARING DRIVEN BY ELECTRIC MOTOR FOR DRIVING AN ADJUSTING ELEMENT, AND INSTALLATION DEVICE

(71) Applicant: IPGATE AG, Pfäffikon (CH)

(72) Inventor: Heinz Leiber, Oberriexingen (DE)

(73) Assignee: IPGATE AG, Pfäffikon (CH)

( * ) Notice: Subject to any disclaimer, the term of this patent is extended or adjusted under 35 U.S.C. 154(b) by 0 days.

(21) Appl. No.: 17/053,351

(22) PCT Filed: Aug. 13, 2018

(86) PCT No.: PCT/EP2018/071923
§ 371 (c)(1),
(2) Date: Nov. 5, 2020

(87) PCT Pub. No.: WO2019/214832
PCT Pub. Date: Nov. 14, 2019

(65) Prior Publication Data
US 2021/0108709 A1    Apr. 15, 2021

(30) Foreign Application Priority Data

May 9, 2018   (DE) .................. 10 2018 111 128.2

(51) Int. Cl.
*F16H 25/20*       (2006.01)
*F16H 25/22*       (2006.01)
(Continued)

(52) U.S. Cl.
CPC ..... *F16H 25/2015* (2013.01); *F16H 25/2204* (2013.01); *F16H 25/2418* (2013.01);
(Continued)

(58) Field of Classification Search
CPC ......... F16H 25/2015; F16H 2061/2884; F16H 2025/2093; F16H 2025/2087; F16H 61/30; F16H 25/2418; F16H 25/2204
See application file for complete search history.

(56) References Cited

U.S. PATENT DOCUMENTS 5,499,547 A *  3/1996  Nagai ................... B23Q 1/58
                                                      108/143
6,158,295 A * 12/2000  Nielsen ................. F16H 25/20
                                                      192/223.4
(Continued)

FOREIGN PATENT DOCUMENTS

DE     202009015840 U1    2/2010
DE     102008059862 A1    4/2010
(Continued)

OTHER PUBLICATIONS

Search Report dated Sep. 19, 2019 in DE Application No. 10 2018 111 128.2.
(Continued)

*Primary Examiner* — David M Fenstermacher
(74) *Attorney, Agent, or Firm* — Panitch Schwarze Belisario & Nadel LLP

(57) ABSTRACT

A helical gearing for driving an adjusting element, which may be an actuator or a piston of a piston-cylinder unit, is driven by an electric motor. The adjusting element may be moved along an axis. The drive apparatus has a rotor, or a translator rotatably mounted in a housing by a bearing and fixedly connected to the input of or formed integrally with the helical gearing. The output of the helical gearing is connected to or formed integrally with the adjusting element. An anti-twist means may prevent the adjusting element from twisting in the circumferential direction about the axis. The helical gearing and/or at least part of the adjusting
(Continued)

element is/are formed to be transversely elastic to the axis of rotation, at least in one region.

39 Claims, 7 Drawing Sheets

(51) Int. Cl.
*F16H 25/24* (2006.01)
*F16H 61/30* (2006.01)
*F16H 61/28* (2006.01)

(52) U.S. Cl.
CPC ...... *F16H 61/30* (2013.01); *F16H 2025/2087* (2013.01); *F16H 2025/2093* (2013.01); *F16H 2061/2884* (2013.01)

(56) References Cited

U.S. PATENT DOCUMENTS

| | | | |
|---|---|---|---|
| 6,767,305 B2 * | 7/2004 | Backes | F16D 65/18 188/161 |
| 9,021,910 B2 * | 5/2015 | Arlt | B62D 7/226 74/388 PS |
| 9,482,325 B2 * | 11/2016 | Drennen | B60T 13/741 |
| 9,586,564 B2 * | 3/2017 | Weh | B60T 8/4018 |
| 9,791,025 B2 * | 10/2017 | Drennen | F16D 65/18 |
| 10,215,265 B2 * | 2/2019 | Yamasaki | F16H 25/2252 |
| 10,378,623 B2 * | 8/2019 | Weh | F04B 9/02 |
| 10,544,615 B2 * | 1/2020 | Takizawa | F16H 25/20 |
| 10,583,917 B2 * | 3/2020 | Klode | H02K 7/14 |
| 10,843,349 B2 * | 11/2020 | Suzuki | F16H 25/22 |
| 10,941,764 B2 * | 3/2021 | Ohm | B60T 13/16 |
| 10,967,443 B2 * | 4/2021 | Lawlor | B23D 29/02 |
| 10,981,428 B2 * | 4/2021 | Rosenfeld | F16C 19/10 |
| 11,035,446 B2 * | 6/2021 | Mengel | A61G 7/018 |
| 11,098,790 B2 * | 8/2021 | Castell | F16H 25/2015 |

FOREIGN PATENT DOCUMENTS

| | | |
|---|---|---|
| DE | 102010052917 A1 | 5/2012 |
| DE | 112009004636 A5 | 6/2012 |
| DE | 102011106626 A1 | 12/2012 |
| DE | 102013221158 A1 | 4/2015 |
| DE | 102014212409 A1 | 12/2015 |
| DE | 102015222286 A1 | 5/2017 |
| DE | 102016208367 A1 | 6/2017 |
| DE | 102017205666 A1 | 11/2017 |
| DE | 102016210221 A1 | 12/2017 |
| DE | 102017211587 A1 | 1/2018 |
| JP | 2004114224 A | 4/2004 |
| JP | 5146993 B2 | 2/2013 |
| WO | 2003016122 A1 | 2/2003 |
| WO | 2010088920 A1 | 8/2010 |

OTHER PUBLICATIONS

Int'l Search Report and Written Opinion dated Jan. 14, 2019 in Int'l Application No. PCT/EP2018/071923, English translation of Int'l Search Report only.

* cited by examiner

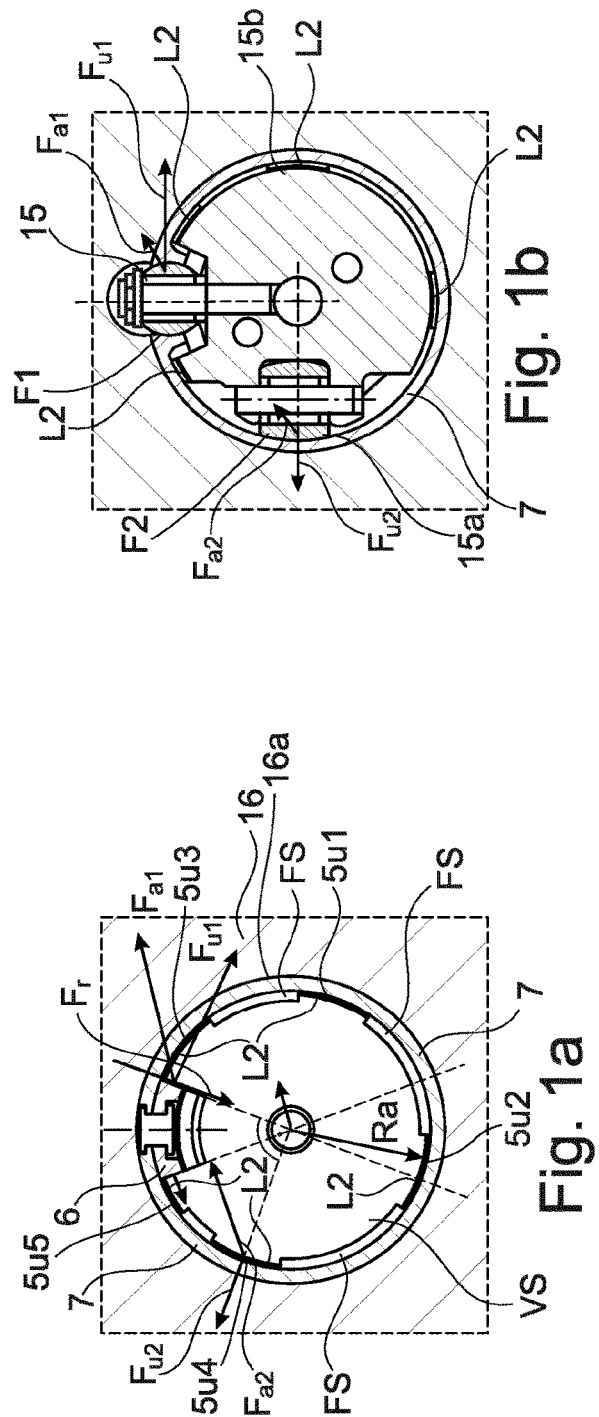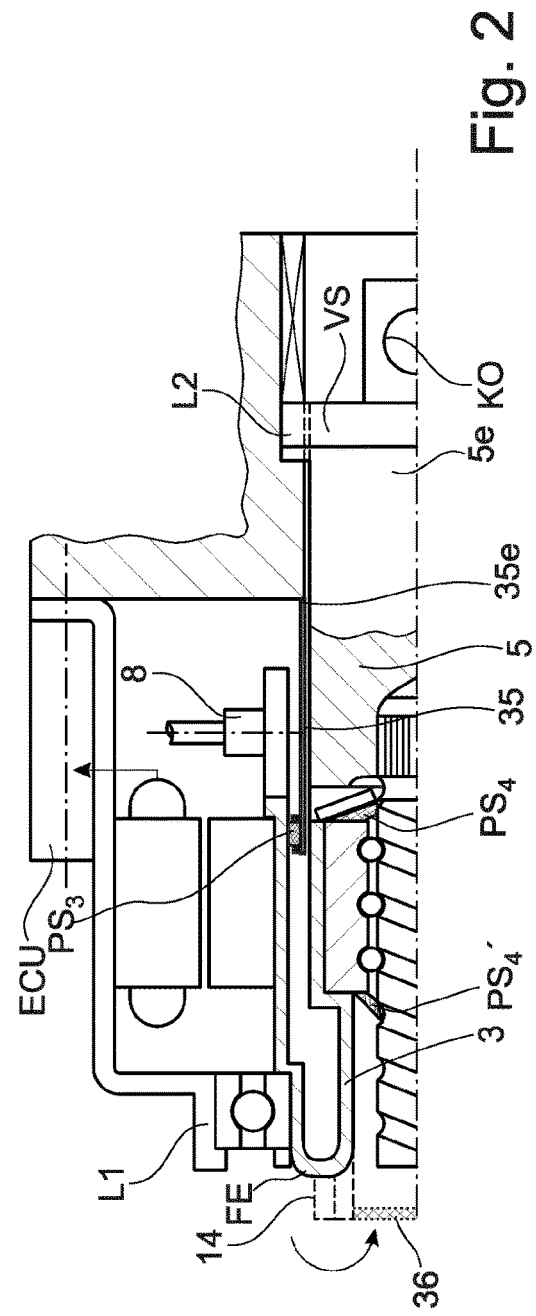

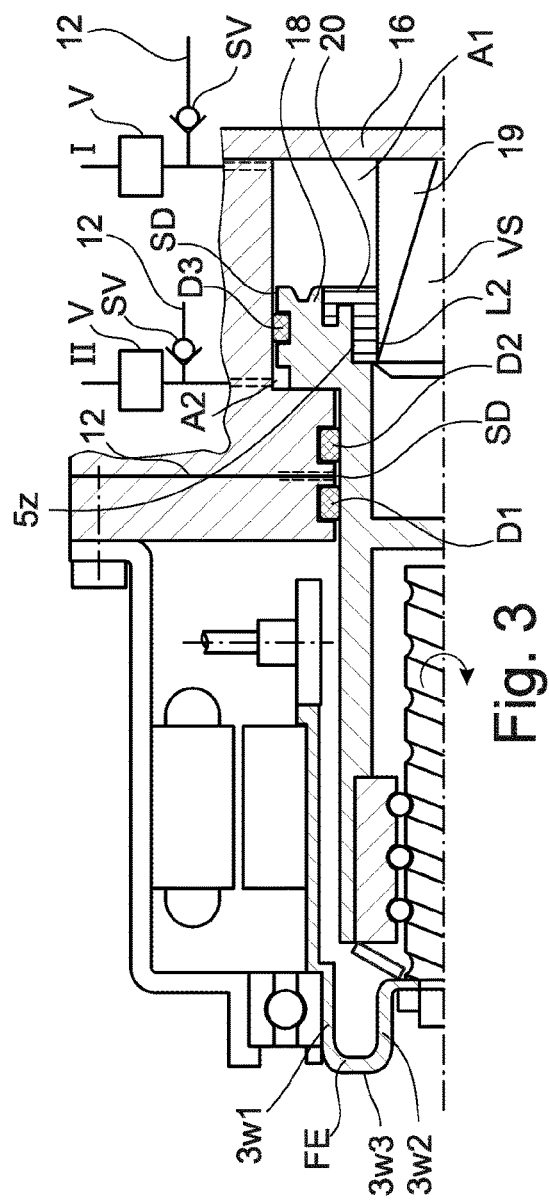
Fig. 3
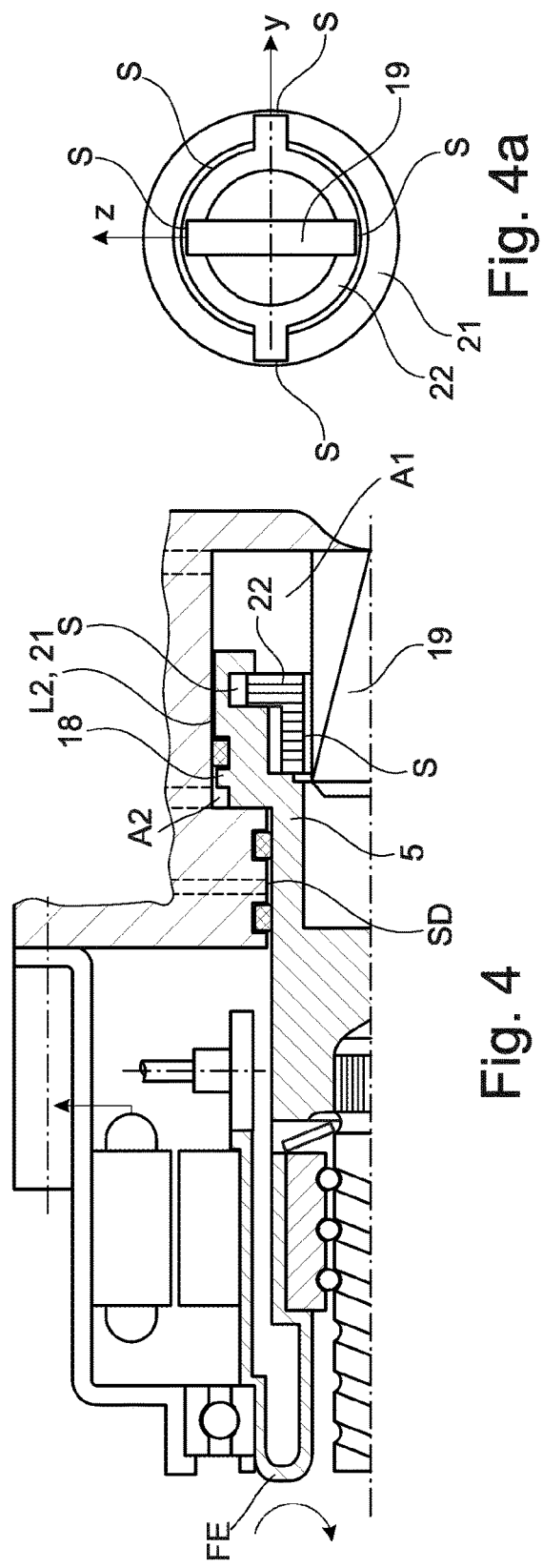
Fig. 4a
Fig. 4

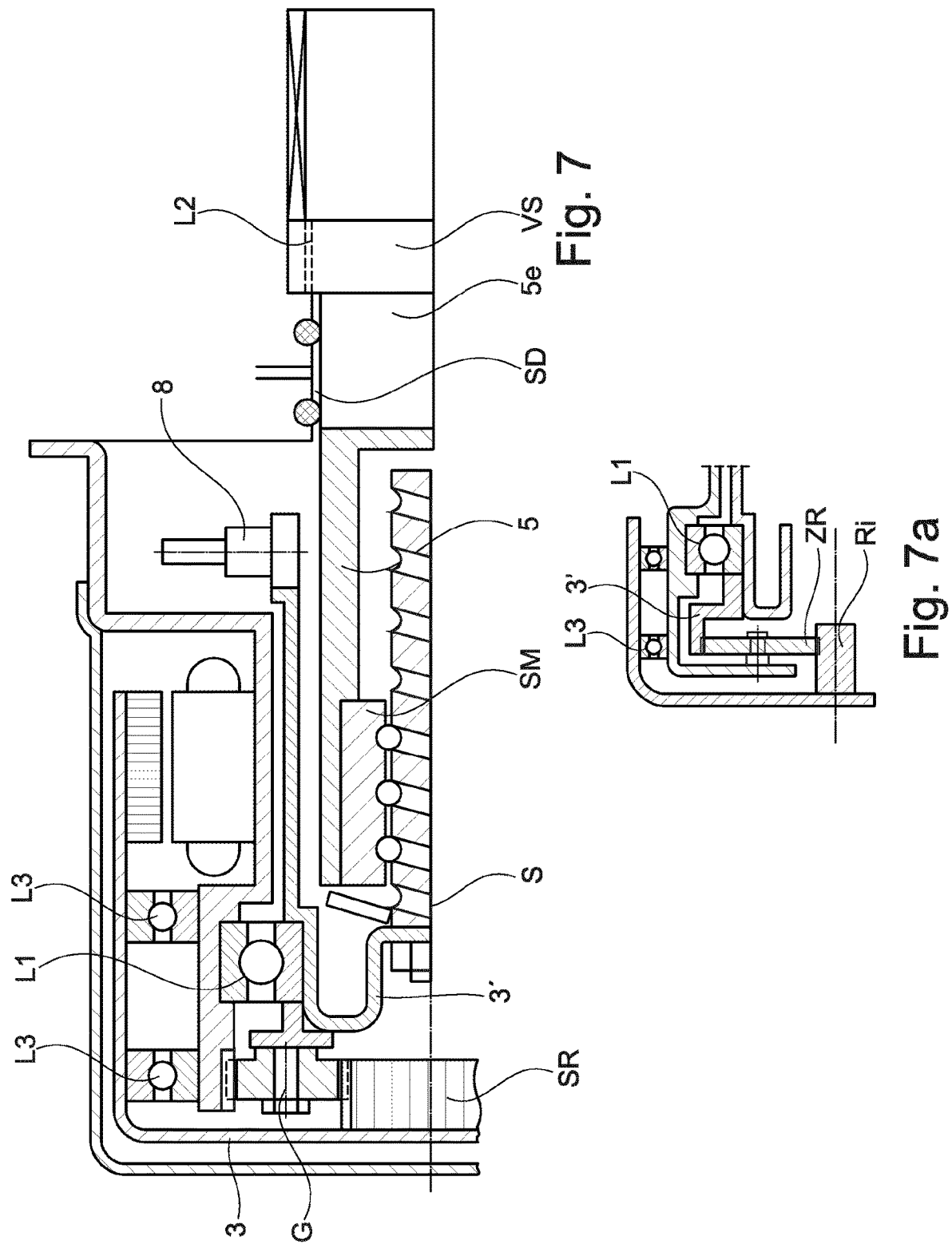

HELICAL GEARING DRIVEN BY ELECTRIC MOTOR FOR DRIVING AN ADJUSTING ELEMENT, AND INSTALLATION DEVICE

CROSS-REFERENCE TO RELATED APPLICATIONS

This application is a Section 371 of International Application No. PCT/EP2018/071923, filed Aug. 13, 2018, which was published in the German language on Nov. 14, 2019 under International Publication No. WO 2019/214832 A1, which claims priority under 35 U.S.C. § 119(b) to German Application No. 10 2018 111 128.2, filed on May 9, 2018, the disclosures of which are incorporated herein by reference in their entireties.

BACKGROUND

The present invention relates to an electric-motor-driven helical gear mechanism for driving an adjustment element, in particular in the form of an actuator or a piston of a piston-cylinder unit, wherein the adjustment element is movable back and forth along a path, in particular axis, by means of an electric drive and a helical gear mechanism, in particular in the form of a spindle drive, wherein the drive has a rotor which is mounted rotatably in a housing by means of a first bearing and which is fixedly connected to or formed integrally with the input of the helical gear mechanism, and that the output of the helical gear mechanism is connected to or formed integrally with the adjustment element, wherein a rotation-preventing securing means prevents a rotation of the adjustment element in a circumferential direction about the path or axis.

PRIOR ART

Motor drives with a spindle for the adjustment of an adjustment element, in particular for the adjustment of an actuator or of a piston of a hydraulic piston drive, are widely used. Here, the rotational movement of the rotor is transmitted to a spindle or spindle nut, wherein the spindle or spindle nut is connected to the adjustment element, in particular in the form of an actuator or piston, and moves this linearly back and forth.

For high efficiencies, use is often made of a ball-screw drive KGT. Here, the torque Ma generated by the motor must be supported in order that the adjustment element does not also rotate. For this purpose, a rotation-preventing securing means is used which acts either directly on the adjustment element or on the spindle nut, if the spindle is connected rotationally conjointly to the rotor. The rotation-preventing securing means may also act on the spindle if the spindle nut is connected rotationally conjointly to the rotor.

The problems listed below arise in the use of a helical gear mechanism, preferably of a ball-screw drive:

A) The drive generates, by way of the various tolerances, an eccentricity of motor axis with respect to the axis of the rotatable spindle or spindle nut, which eccentricity is transmitted to the adjustment element or the piston, the helical gear mechanism, composed of spindle and spindle nut, and possibly seals and the rotation-preventing securing means.

B) In the case of the transmission of the eccentricity to the adjustment element or to the piston, a transverse force on the adjustment element or the piston arises in a manner dependent on the elasticity of the transmission.

C) The transverse force described in B) generates friction and wear on the adjustment element or the piston.

D) If the piston becomes worn, for example score marks form, the sealing action is no longer ensured, which conflicts in particular with fail operational requirements FO.

E) The rotation-preventing securing means is likewise acted on by the eccentricity and additionally by the supporting motor torque Ma. The forces to be imparted, and the associated friction, normally generate a high level of wear. The abovementioned forces can furthermore generate additional transverse forces on the adjustment element or the piston.

F) The wear resulting from E) can also occur on the piston running surface, such that the seal moves and can fall out, which is likewise critical in the case of fail operational requirements.

G) Dependency of the functions on temperature and tolerances.

H) Complexity, number of parts for spindle drive with motor and rotation-preventing securing means and tolerance chains.

Aside from the tolerances that determine the eccentricity of the rotating parts, the deviation of motor, spindle and piston axis also have an effect on the spindle drive. The coupling of the motor to the piston housing can be mentioned as an example here. Typically, the motor in this case has a flange which protrudes into the piston housing, with tolerances for flange and piston housing. These tolerances result in a minimum and maximum clearance, resulting in a corresponding offset of the axes with respect to one another. A considerable offset arises in relation to other components of the spindle drive, which may amount to more than the eccentricity by up to a factor of five. This offset may also, in the case of a corresponding construction, influence the above-stated problems A) to F).

Spindle drives have been described in numerous publications. For example, the documents listed below all present electric-motor-driven pistons, with a helical gear mechanism in the form of a spindle drive interconnected between electric drive and piston. In order to avoid numerous unnecessary descriptions and explanations, the respectively occurring problems will be indicated below with regard to each of the documents.

DE 10 2008 059 862 A1 has disclosed an electrohydraulic brake system for motor vehicles, in the case of which the rotor is fixedly connected to the spindle nut, and the spindle is formed integrally with the piston. Here, the rotor is mounted together with the spindle nut on the housing by means of two bearings, wherein the rotation-preventing securing means is arranged in that end of the spindle-piston component which is averted from the piston. This construction gives rise in particular to the problems A), B), C), D), E) and F).

DE 11 2009 004 636 likewise describes a brake system, in the case of which a piston of a piston-cylinder system is connected via a plunger to the driven spindle. Here, in particular, the problems A), B), C), D), E), F) and G) arise, wherein, overall, relatively low loads occur because the piston are connected via the plunger to the spindle, such that, for example, the eccentricity and transverse forces are reduced owing to the joint piece formed by the plunger.

DE 10 2011 106 626 A1 has disclosed a highly dynamic crank drive for a piston-cylinder unit, in the case of which, likewise, the problems A), B), C), D), E), F) and G) play a role, wherein it is also the case here that the loads acting on the rotation-preventing securing means are reduced by means of an elastic casing and a roller.

In the case of the electric drive described in DE 10 2013 221 158 A1, the problems A) to G) arise, wherein, owing to the eccentricity of the rotating parts, high loads and forces act owing to a low elasticity and the rotation-preventing securing means.

The pressure generator known from DE 10 2014 212 409 A1 for a hydraulic vehicle brake has a doubly mounted rotor which drives a spindle nut via a planetary gear mechanism. Spindle and piston are formed as a single piece, wherein the piston is mounted exclusively by way of its lateral surface and the rotation-preventing securing action is realized by means of a rod which engages into the piston end side and which has a hexagonal cross section. In the case of this pressure generator, too, the problems A) to G) arise. The same applies to the hydraulic assembly known from DE 10 2015 222 286 A1. Here, high transverse force loads on the piston occur, which results in increased wear also for the cylinder inner wall and the seals. It is also the case in DE 10 2017 211 587 A1 and in the brake pressure control unit known from DE 10 2016 208 367 A1 that the problems A) to G) can arise. In the case of DE 10 2016 208 367 A1, an elastically deformable preload element is used in order to compensate relatively large tolerances.

Problem Addressed by the Invention

The problem addressed by the invention is that of further developing an electric-motor-driven helical gear mechanism for driving an adjustment element such that the parts wear to a lesser extent.

Solution to the Stated Problem

BRIEF SUMMARY OF THE DISCLOSURE

Said problem is solved according to the invention by means of an electric-motor-driven helical gear mechanism for driving an adjustment element, in that the rotation-preventing securing means is arranged in or on the end region of the adjustment element or the end region is part of the rotation-preventing securing means, wherein the end region is that region of the adjustment element which is averted from the helical gear mechanism, and/or, between the first bearing and the adjustment element of the rotor or transmitter, the helical gear mechanism and/or at least a part of the adjustment element are/is, at least in one region, of elastic form transversely with respect to the axis of rotation, wherein the at least one region has in particular a spring element or a region of increased elasticity.

Advantageous refinements of the helical gear mechanism emerge from the features of the subclaims.

As a result of the fact that the first bearing for the rotor and the rotation-preventing securing means lie far apart, the construction alone has the effect that tolerances are compensated and the load on the bearings is reduced. Here, it is advantageously the case that, between the first bearing and the end region or a radial slide bearing arranged in said end region, there is no further bearing for radially supporting the rotor and the helical gear mechanism. This design alone results in a relatively high degree of transverse elasticity, owing to which the wear resulting from eccentricity of the rotating parts is considerably reduced.

Through the provision of a transverse elasticity in the rotor, helical gear mechanism and/or the adjustment element as a non-deformable elasticity, it is advantageously furthermore possible for the wear to be reduced, because the transverse forces are advantageously reduced by means of the elasticity. It is thus advantageous if the rotor is, at least in a region between the first bearing and the input of the helical gear mechanism, of elastic form transversely with respect to the axis of rotation, in particular has a spring element or a region of relatively high elasticity. In this way, virtually all of the above-described problems A) to G) are resolved or greatly alleviated. Also, the helical gear mechanism according to the invention with drive and adjustment element is of low complexity. The solution can be used both for rotating spindles or spindle nuts, wherein rotating spindle nuts generally require a somewhat greater structural length, but it is advantageously the case that no grease is centrifuged away from the rotating spindle and additional measures such as an additional protective ring on the spindle nut SM are required. It is advantageous, owing to the good efficiency, for a ball-screw drive KGT to be used.

It is thus also possible for spindle gear mechanisms of a variety of types, in particular ball-screw drives, to be used. It is also possible the adjustment element to be an actuator or a coupling part to a drive, which is moved back and forth on a path and itself drives or adjusts something else. It is however preferable for a piston to be moved back and forth by means of the helical gear mechanism, wherein the piston is adjusted in a cylinder for the purposes of pressure generation and for the purposes of pressure dissipation or for the purposes of maintaining pressure in one or more hydraulic circuits. Here, the piston may be in the form of a single-stroke piston, which delimits only one pressure chamber, or in the form of a double-stroke piston, which sealingly separates two pressure chambers from one another. Other piston-cylinder systems are self-evidently likewise driveable by means of the electric-motor-driven helical gear mechanism according to the invention.

The first bearing may advantageously be arranged between that part of the rotor which bears the rotor winding and/or the permanent magnets and the input of the helical gear mechanism, wherein, in the context of the invention, an input of the helical gear mechanism is considered to be that component of the helical gear mechanism which is driven by the rotor, which component may be the spindle nut or the spindle.

It is likewise possible for a transmitter to be mounted by means of the first bearing and to be connected rotationally conjointly to the input of the helical gear mechanism, wherein the transmitter is driven by a rotor of a motor and by an interconnected gear mechanism.

It is particularly advantageous if, additionally in the region of the rotation-preventing securing means, there is arranged a radial slide bearing, or the rotation-preventing securing means itself additionally is or forms a radial slide bearing. In this way, both the radial support and the rotation-preventing securing action are ensured in an extremely small space.

In a further possible refinement of the invention, the rotor is of double-walled form in cross section at least in the region from the first bearing to the input of the helical gear mechanism, wherein the two wall portions or walls, which are in particular arranged parallel to one another, are connected to one another via a wall portion which is curved, in particular of U-shaped cross section. Here, the wall portions may be formed as a single piece or welded, riveted, flanged or adhesively bonded to one another.

In a further possible refinement of the possible embodiments described above, the adjustment element may be mounted slidingly in an axial direction with its end region in a guide, in particular in a cylinder, wherein the outer radius of said adjustment element is, at least in sub regions of its outer wall, formed such that the end region slides with a clearance fit or sliding fit in the guide or the cylinder and forms a radial plane bearing with the cylinder or the guide with the least possible clearance. Here, the remaining part of the adjustment element, in particular in the form of a piston, advantageously has an outer diameter or an outer contour which is smaller than the outer radius or diameter or outer contour required for an interference fit. The seals for sealing off the piston are in this case advantageously arranged in the region with an outer radius or diameter which is reduced in relation to the sliding fit, such that the outer wall of the adjustment element does not make contact with the inner wall of the guide or of the cylinder, at least in the region of the seals. This means that the region in which the seals are arranged has a greater clearance than the region that serves for the mounting of the adjustment element. As a result, no contact between the piston and the cylinder inner wall occurs.

The rotation-preventing securing means may in this case be formed by at least one projection which points radially inwardly in the cylinder, in particular in the form of an axially extending web, and/or recess, in particular in the form of a groove, which interacts in each case with a groove or a recess, respectively, in the end region of the adjustment element or piston in order to form the rotation-preventing securing means. Here, the axially extending web may be formed for example by a segment-shaped part which is fastened, in particular riveted or welded, to the cylinder inner wall.

It is alternatively also possible for a flange piece to be provided which receives a bore and the above-described web for the rotation-preventing securing means and optionally also the cylinder bore and the seals. In this way, it would be possible for all tolerance-sensitive parts to be manufactured in a single chucking operation with small tolerances. The flange piece must in this case be fastened to the motor housing.

It is likewise possible for the cylinder to have axially running guide surfaces, and for the end region of the adjustment element or piston to likewise have at least one guide surface, wherein a rotatably mounted rolling part rolls on both the guide surfaces and, together with these, forms the rotation-preventing securing means. Here, the rolling part advantageously serves for minimizing the friction, in particular at the start of the movement.

The adjustment element or the piston may likewise slide at least with a part of the outer wall of its end region on the inner wall of the cylinder with a sliding fit, so as to form a radial slide bearing, or be radially supported or mounted by means of a slide ring. In this way, the radial slide bearing and the rotation-preventing securing means are advantageously formed in a small space with few parts.

The rotation-preventing securing means may be arranged on, in particular fastened to, the end of the adjustment element or piston. It is thus possible, for example, for the rotation-preventing securing means to also be pressed onto an end-side peg of the adjustment element or piston and additionally secured against rotation by peening.

If the adjustment element is a double-stroke piston of a piston-cylinder system, either the rotation-preventing securing means and/or bearing arrangement may be arranged in the interior of the double-stroke piston, wherein, to form the rotation-preventing securing means and/or bearing arrangement, a molded piece engages into a corresponding recess of the double-stroke piston and bears said piston by means of a slide mounting and/or secures said piston against rotation, wherein the molded piece is fastened rotationally fixedly to the housing or is formed as a single piece therewith. It is however likewise possible for the rotation-preventing securing means to be realized by the engaging molded piece, and for the bearing arrangement to be realized externally between the lateral surface of the double-stroke piston and the cylinder inner wall or by means of a slide ring arranged in between (FIG. 4).

If the rotation-preventing securing means and second bearing are formed separately, the rotation-preventing securing means may also be realized by means of an Oldham coupling, because this can advantageously compensate tolerances in different directions. The Oldham coupling may in this case be formed by the end region of the adjustment element, a bearing part which lies therein and is secured against rotation by positive locking, and a molded part which in turn engages in positively locking fashion in the bearing part in rotation-preventing fashion, which molded part is for example arranged rotationally fixedly on, or fastened to, the housing or cylinder.

If the electric-motor-driven helical gear mechanism drives a piston of a piston-cylinder unit, the piston thereof may be sealed off by means at least one seal, advantageously at least two seals arranged in parallel, wherein the first seal, the so-called primary seal, absorbs the pressure. Here, it may be advantageous if a channel between two seals opens into the cylinder interior space, which is connected to a reservoir. This advantageously permits additional functions. It is thus possible for a leakage flow via the channel which opens in between the seals to be returned to a reservoir, wherein the second seal prevents precisely this leakage flow from escaping. Through the provision of a further redundant primary seal in parallel with respect to the primary seal, a leakage flow can be detected at an early point in time without the system failing. It is thus possible, for the diagnosis of the leakage flow, for a further channel to be provided which opens into the cylinder interior space between the two primary seals and which is likewise connected, via a throttle, to the reservoir. In the event of failure of the first primary seal, a leakage flow then flows via the further channel and the throttle to the reservoir, and this is identified owing to reduced delivery performance of the system.

In the event that a fault in the control causes an undesired return movement to the initial position, a resilient stop is provided which brakes the rotational movement of spindle or spindle nut. The stop may be formed for example by a stop element, in particular in the form of a resilient ring and/or a spring, wherein the stop element may advantageously be arranged on the spindle.

The electric-motor-driven helical gear mechanism according to the invention may advantageously serve for the adjustment of a piston which maintains, builds up and/or dissipates a pressure in at least one pressure chamber or at least one hydraulic circuit connected thereto. According to the invention, the set or adjusted pressure may serve inter alia also for the adjustment of wheel brakes, clutches and/or gear actuators.

By means of an installation device for the electric-motor-driven helical gear mechanism according to the invention, said helical gear mechanism can be installed and centered in an advantageous manner. The installation device can thus advantageously be mounted on and/or fastened to the housing of the electric-motor-driven helical gear mechanism, wherein the installation device, by way of its housing, engages around and lies against that region of the housing which holds the first bearing, and said installation device, by way of a ball bearing, preloads the first bearing, wherein the installation device has means for the radial alignment of the input of the helical gear mechanism and thus for the bending of the rotor such that the axis of rotation of the helical gear mechanism is in alignment with the axis of the adjustment element and/or or of the rotation-preventing securing means.

Before the installation and alignment device is connected to the motor housing, the adjustment element or piston is installed in the housing, wherein subsequently the connection of the rotor to the input of the helical gear mechanism, that is to say either the spindle nut or the spindle, depending on which element must be connected to the rotor. After the mounting of the installation and alignment device, the rotor is preloaded with the helical gear mechanism as if an axial force were acting on the adjustment element or the rotation-preventing securing means. In this way, the motor housing can be displaced axially and screwed together with the housing for the adjustment element, in particular in the form of the piston housing. Here, the transverse elasticity of the rotor or of the drive as a whole centers the motor housing relative to the housing of the adjustment element or relative to the piston housing, wherein, in this way, all tolerances of the non-rotating parts that would contribute to a transverse offset of motor housing and adjustment element housing or piston housing are eliminated or substantially eliminated.

As already stated, it is advantageous if, in the case of a spindle drive being used for a piston, the rotating parts have a small eccentricity in order that the drive axis of the spindle and spindle nut, which run on one another, have a small center offset, and the piston, with its seals, is not subject to any transverse force, and thus wear and damage to the sealing surfaces on the piston is avoided. In this way, the risk of leakage of and wear to the seal is considerably reduced, which is of enormous importance in particular with regard to fail operational requirements for autonomous vehicles.

The mounting of the spindle piston drive on the rotor and on the rotation-preventing securing means, advantageously in a bore of the piston, gives rise to numerous advantages. Here, the rotation-preventing securing means may advantageously be is filled with hydraulic liquid, which has a friction-reducing action, wherein hydrodynamic effects advantageously arise during movement. The piston on which the seals act may advantageously have a small clearance at least in the region of the piston seals.

The motor sensor is commonly moved by means of a toothed-wheel drive. For the reduction of noises, use may also be made of a friction-wheel drive, which has an alignment cam or a 1-tooth engagement which compensates the possible slippage of the friction-wheel drive.

Aside from the direct drive of the rotor to the spindle, use may also be made of a separate rotor which drives the spindle via a planetary gear mechanism or spur gear mechanism. In this way, only a relatively low motor torque is required, which permits motor downsizing and even a trapezoidal spindle with higher friction.

Many drives with ball-screw drive must satisfy high safety requirements. This applies in particular in the case of autonomous driving-fail operational. Here, many components are provided redundantly, inter alia also motors, which are controlled in 2×3-phase fashion. A redundant ball-screw drive with drive is, by contrast, very cumbersome and expensive. The ball-screw drive is however very fail-safe but susceptible to small, in particular metallic particles which can pass into the ball raceway and then block the ball-screw drive. To reliably prevent this, the ingress of particles into the ball-screw drive or onto the running surface of the balls should be prevented. Here, the invention proposes the provision of at least one protective device, for example in the form of a particle scraper or a seal, such that the ball-screw drive is effectively encapsulated from the outside environment in a closed space. If one side of the ball-screw drive is arranged in a closed space, for example a piston, the encapsulation is relatively easy to implement. In the case of ball-screw drives, so-called dirt scrapers are duly known which additionally also perform the function of filling with grease. Said dirt scrapers however normally do not sufficiently reliably prevent an ingress of metallic particles. The abovementioned dirt scrapers may however self-evidently be used in addition to the particle scrapers. The particle scrapers may be produced for example from felt.

BRIEF DESCRIPTION OF THE DRAWINGS

The foregoing summary, as well as the following detailed description, will be better understood when read in conjunction with the appended drawing, which is provided for purposes of illustration, only. It should be understood, however, that the invention is not limited to the precise arrangements and instrumentalities shown. In the drawing:

FIG. 1a: shows a rotation-preventing securing means with sliding guide;

FIG. 1b: shows a rotation-preventing securing means with roller guide;

FIG. 2: shows a spindle drive with rotating spindle nut;

FIG. 3: shows a double-stroke piston (DHK) with a slide bearing arrangement and rotation-preventing securing means within the piston;

FIG. 4: shows a double-stroke piston DHK with second bearing arrangement on the piston and a rotation-preventing securing means with Oldham coupling;

FIG. 4a: shows a rotation-preventing securing means implemented by means of an Oldham coupling;

FIG. 5a: shows a piston with a third seal;

FIG. 7: shows a further possible embodiment with a gear mechanism interconnected between rotor and transmitter;

FIG. 7a: shows an alternative embodiment with a spur-gear mechanism.

DETAILED DESCRIPTION OF THE INVENTION

Figure 1:
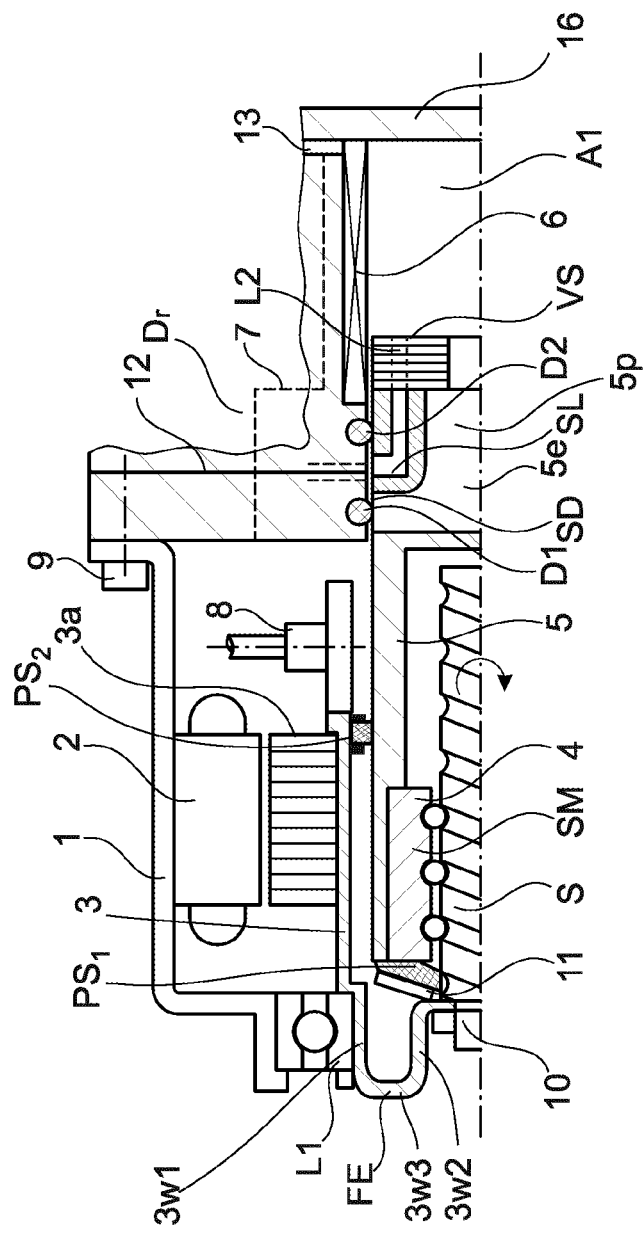
FIG. 1: shows the spindle drive with rotating spindle with motor and rotor bearing arrangement (bearing arrangement L1), elastic rotor and second bearing arrangement on the rotation-preventing securing means and piston seals.

FIG. 1 shows, in a diagrammatic illustration, the major components of the motor-spindle drive with motor housing 1, stator with winding 2, rotor 3, spindle S, spindle nut SM, helical gear mechanism 4, which is in the form of a ball-screw drive (KGT), piston 5 as adjustment element, and rotation-preventing securing means VS. The rotor 3 is mounted in the first ball bearing L1 and is connected by means of a nut 10 to the spindle S. As is also presented in the prior art, the kinematics of the rotation and conversion into translation are highly complex. Consideration must be given inter alia to the eccentricity and its effect on the rotation-preventing securing means, with the overall force balance of the radial and axial forces with resulting friction forces. The rotor 3 is fixed by means of an interference fit to the spindle peg Sz by means of the screw 10. Aside from the frictional locking by means of the frictional moment of the axial force of the nut 10, use may also be made of an additional positively locking connection, for example by means of a pin or ball (not shown) between spindle S and rotor flange 3f. The fit between peg Sz and rotor 3 determines the first tolerance. The fit between rotor 3 and ball bearing L1 determines the second tolerance. Both fits determine, aside from the offset of fit with respect to motor axis, the eccentricity. The rotor 3 drives the spindle S and move the spindle nut SM with the piston 5 which is fastened thereto or formed integrally therewith, which piston is sealed off with respect to the piston housing 7 by means of two seals D1 and D2. The rotation-preventing securing means VS is fastened to the front end, for example by means of a calked or flanged connection. The rotation-preventing securing means VS runs in a segment-shaped support 6 which accommodates the motor torque Md. The rotation-preventing securing means VS simultaneously performs the task of the bearing arrangement L2 in the piston bore 5z. The sliding movement runs in liquid and, in a manner dependent on the speed, with low friction owing to the known hydrodynamic effect. The rotation-preventing securing means VS is composed of corresponding sliding material, preferably plastics or tin bronze. In the case of relatively high operating pressures, the piston force acts via the ball-screw drive KGT on the ball bearing L1. Here, the eccentricity or center deviation of the rotor 3 is compensated by means of the predominantly elastic design of the rotor 3, but also by bending of spindle S, piston 5 and tilting movement of the rotation-preventing securing means VS. Here, no forces act on the piston 5 and sliding surfaces of the seal D1, D2, because the tolerances of rotation-preventing securing means VS, piston 5 and cylinder bores ensure a clearance $S_O$. The rotation-preventing securing means VS runs in the piston 5 with a small clearance. The tolerances of rotation-preventing securing means VS and bore are dimensioned accordingly. Thus, the operational reliability of the seal D1, D2 is greatly improved, which is of particular importance in the case of AD and FO requirements. The rotation-preventing securing means VS is, in accordance with the above-mentioned elasticity and eccentricity, acted on by a small transverse force. In addition, the rotation-preventing securing means VS is also acted on by a circumferential force Fu, which is dependent on the motor torque Md and the requirement on the operating pressure to be set in the pressure chamber A1.

In the event of a fault in the control or failure, the piston 5 may retract quickly, which is absorbed by a resilient stop 11 which simultaneously brakes the rotating spindle nut SM. For the control of the motor and detection of the piston position, the rotor 3 drives, via a toothed-wheel drive, the motor sensor, in the case of which the shaft is connected to a target which is preferably a Hall element and seated on the PCB of the ECU.

The motor housing 1 is seated flat, without a conventional centering collar, on the piston housing KG and is fastened thereto by means of screws 9. For better installation, seals and piston running surface may be arranged in a flange piece. The installation and centering are described in FIG. 5.

During the axial adjustment of the piston, in the case of hydraulic applications, small axial forces act in the stroke start region, said forces being absorbed by the first bearing L1. In this case, the eccentricity of the rotating parts is, by tilting about the bearings L1 and L2 and/or in the case of a corresponding design of the rotation-preventing securing means VS, also absorbed by the latter. In the case of high axial forces, the first bearing L1 is preloaded with such intensity that the eccentricity is absorbed by the elasticity of rotor 3, helical gear mechanism S, SM and/or adjustment element.

To prevent the ingress of dirt, the ball-screw drive, composed of spindle S and spindle nut SM, is at least one particle scraper $PS_i$ may be provided. The one or more particle scrapers $PS_i$ are intended in particular to prevent particles that run astray during the installation of the helical gear mechanism from subsequently passing into the ball raceway during operation. At the least, a particle scraper $PS_i$ should be provided which is arranged on the open side of the ball-screw drive. This may be fastened or fixed in particular to the rotor 3, as illustrated, or to the piston 5. In FIG. 1, it would thus be the intention for at least one of the two particle scrapers $PS_1$ or $PS_2$ to be provided. In order that no particles can pass through the connection of rotor 3 and spindle S from the left, it is also possible here for a corresponding connection and/or seal to be provided. For reliability, it is also possible for both particle scrapers $PS_1$ or $PS_2$ to be provided. The spindle S lies with its right-hand end in the piston, which hermetically encloses the spindle from the right. The particle scraper $PS_1$ is in this case arranged between stop ring 11 and spindle nut SM or end side of the piston 5. The particle scraper $PS_2$ is arranged between rotor 3 and piston 5. The particle scraper $PS_i$ may advantageously be composed of an in particular felt-like material, the material and dimensions, in particular fibers, of which do not damage the ball-screw drive.

The helical gear mechanism according to the invention is preferably assembled in a clean room.

FIG. 1a shows a section through the cylinder bore 7z with the rotation-preventing securing means VS. The rotation-preventing securing means VS acts at both sides on a segment-shaped support 6, which in this case is riveted, alternatively laser-welded, to the flange piece 7. This solution has the advantage that the sliding surfaces in the cylinder bore 7z and the support have a high surface quality, resulting in low friction and little wear. The motor torque Md generates a circumferential force $F_{U1}$ on the support 6, which is transmitted as a reaction force $F_{U2}$ from the rotation-preventing securing means VS to the cylinder bore 7z. The rotation-preventing securing means VS is guided with a small clearance in the bore 7z via the bearing point L2, wherein, for this purpose, the tolerances of rotation-preventing securing means VS and bore 7z must be provided correspondingly. The motor torque Md acts, correspondingly to the set operating pressure, with considerably greater intensity during the forward movement for the build-up of pressure than during the backward movement for the dissipation of pressure $P_{ab}$, because substantially the piston force effects the return movement. The circumferential force also generates friction forces in a radial direction, which are insignificant owing to the mounting of the rotation-preventing securing means VS in the bore 7z. The radial forces, too, are small owing to the elasticity, primarily of the rotor 3. By contrast, the axial friction forces that act during the movement of piston and rotation-preventing securing means VS are not negligible and are dependent on the motor torque Md and the circumferential forces $F_{U1}$ and $F_{U2}$. The friction coefficient is definitive here. This is however already low owing to the hydrodynamics. It may additionally be reduced further by virtue of roller bearings being provided as illustrated and described in FIG. 1b.

FIG. 1b shows an alternative to the sliding guide of the rotation-preventing securing means VS as illustrated in FIG. 1a. In the embodiment as per FIG. 1b, rollers 15 and 15a, which are advantageously mounted by means of needle bearings, transmit the circumferential forces $F_1$ and $F_2$. Optionally, a third roller 15b may be used on the opposite side of roller 15a. Here, too, additional bearing points L2 are provided for the guidance of the rotation-preventing securing means VS. In this embodiment, too, the rotation-preventing securing means VS is guided in the bore with a clearance at the bearing points.

FIG. 2 shows an embodiment with a rotatable spindle nut SM. The spindle S is connected to the piston 5 or to a coupling piece KO for the linear drive of a mechanism. The use is not restricted only to hydraulics. Here, too, a rotation-preventing securing means VS is required, which, in the case of a non-hydraulics configuration, runs with dry bearings or a grease filling. In the case of such an embodiment, the seals D1 and D2 may be omitted. The mounting by means of the bearing arrangements L1 and L2 is however maintained. In contrast to FIG. 1 with a single-part rotor 3, use may be made of a two-part rotor 14. The drive with motor is expediently connected to an ECU, for which purpose corresponding contacts to the motor are provided.

Similarly to the seal arrangement of the thrust-rod piston with primary seal D2 and secondary seal D1, volume is conveyed from the reservoir 12 into the pressure chamber via the breather hole SL.

The particle scraper PS3 may be arranged or act between a carrier part 35, which is fastened to or arranged on the piston housing 16 or the flange 7, and the rotor 3 or the piston 5. Alternatively or in addition, at least one of the particle scrapers $PS_4$, $PS_4'$ may be provided, which may be arranged between stop ring and spindle nut SM or between spindle nut SM or rotor 3 and the spindle S.

It is likewise possible for a closure means 36 to be provided which closes the rotor 3 at its end side and thus prevents the ingress of dirt particles from that side.

FIG. 3 shows an embodiment which substantially corresponds to the arrangement of FIG. 1, with the difference that a double-stroke piston DHK is used which conveys volume under pressure during a forward movement and during a return movement and which sealingly separates two pressure chambers A1 and A2 from one another. This is performed by means of infeed valves V, which may be simple check valves or solenoid valves. Additionally, here, suction valves SV with a connection to the reservoir 12 are required. These may self-evidently also be used in the case of the embodiment as per FIG. 1. Aside from the seals D1 and D2, a further seal D3 may be provided for the stepped piston. Here, too, there is again a clearance $S_0$ such that the sealing surface is not subjected to load. The rotation-preventing securing means VS is in this case arranged in the piston 5. Said rotation-preventing securing means is composed of a profiled bar 18, for example square or hexagonal, which supports the motor torque Md from the piston 18 via a bearing piece 19. The profiled bar 18 is fixedly connected to the piston housing 16. The rotation-preventing securing means VS in this case simultaneously also forms the bearing arrangement L2.

FIG. 4 shows an embodiment which substantially corresponds to that of FIGS. 2 and 3. Here, the bearing arrangement L2 is realized by means of a slide ring in the piston 5. Here, too, the rotation-preventing securing means VS is configured in the piston 5 as an Oldham coupling. The profiled bar 19 may in this case be a rectangular profile. The Oldham coupling piece can in principle compensate the piston movement in the y and z directions and is mounted in floating fashion between piston 18 and profiled bar 19 by means of clearance S. With this solution, the central axis of the profiled bar 18 can be configured with greater tolerances.

The collective consideration of all facts, also problems A) to G), show the complexity of the kinematics and also the resolution thereof with small forces acting both radially and axially. The electric-motor-driven helical gear mechanism according to the invention can advantageously be used within a wide scope in the hydraulics sector. Here, as described above, the piston may be a single-stroke and double-stroke piston. It is however likewise possible for the electric-motor-driven helical gear mechanism according to the invention to be used for driving a mechanism, wherein the adjustment element then functions as an actuator or coupling for a drive.

Figure 5:
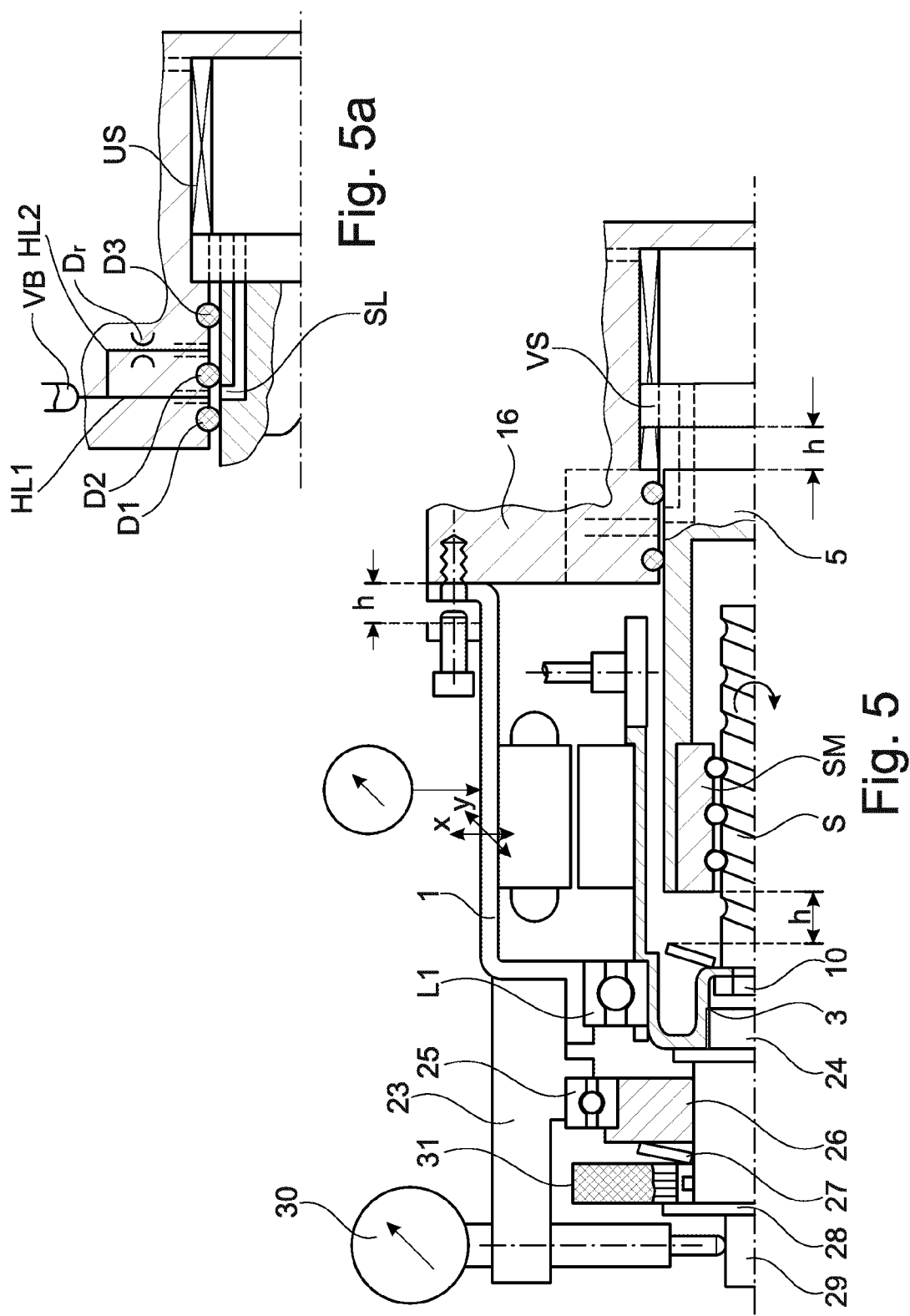
FIG. 5: shows the installation and alignment device.

FIG. 5 shows an installation and alignment device which is required for centering the motor in the piston housing. The piston 5 with rotation-preventing securing means VS is installed in the piston housing. Here, the spindle S is set with a pre-stroke h. Subsequently, the spindle S is connected to the rotor 3 by means of the nut 10. Owing to the pre-stroke h of the spindle setting, the motor accordingly has the spacing h to the piston housing. Next, the drive shaft 24 is connected to the rotor 3 or to a specially designed nut 10. Then, for the preloading of the ball bearing L1, an adapter 23 is mounted onto the motor housing 1. Situated in said adapter 23 are a ball bearing 25 and a ring 26, which is mounted on the drive shaft. In a further step, a disk spring with a knurled wheel 31 is introduced. Subsequently, the disk spring 27 is preloaded and is secured axially by means of a securing ring. The ball bearing L1 is thus preloaded as if an axial force were acting from the piston. The motor housing with coupled-on piston is then moved axially, such that the motor housing sets down on the piston housing. Subsequently, the screws 9 of the motor fastening are tightened slightly, then, by means of the knurled wheel, the rotor 3 and spindle S are moved, such that the piston 5 with rotation-preventing securing means VS moves axially. Here, the entire stroke can be travelled through, and the motor housing assumes a centered position relative to the piston housing. The eccentricity results in a small radial force on the rotation-preventing securing means VS, which can be detected by means of a measurement sensor. If, as expected, the piston stroke is travelled through without great friction=torque on the knurled wheel, the final fastening of the motor housing is performed. The measurements may be extended as desired by virtue of the motor housing being pressed with different axial forces on the piston housing and the radial movement of the motor housing being measured possibly together with the eccentricity of the rotor on the measurement peg.

As an alternative to the x/y alignment of the motor housing by means of rotation of the spindle, it is also possible for a pressure to be exerted on the piston, which pressure is generated for example by means of compressed air. Here, the spindle S with spindle nut SM is aligned in a clearance-free manner by means of the axial force, whereby the x/y alignment occurs automatically. Here, the spindle S may additionally also be rotated through approximately 360°. Subsequently, the motor housing is fixed by means of fastening screws 9.

FIG. 5a shows the piston with a third seal D3, which serves as a redundancy seal in relation to seal D2 for extremely high FO requirements. If the seal D3 fails, with a large leakage flow, then a leakage flow flows via the throttle Dr into the reservoir. Said leakage flow is identified, from a delivery rate reduced by approximately 10%, by the diagnostic device. By contrast, without the seal D3 and in the case of the same leakage flow through the seal D2, the pressure supply would fail.

Figure 6:
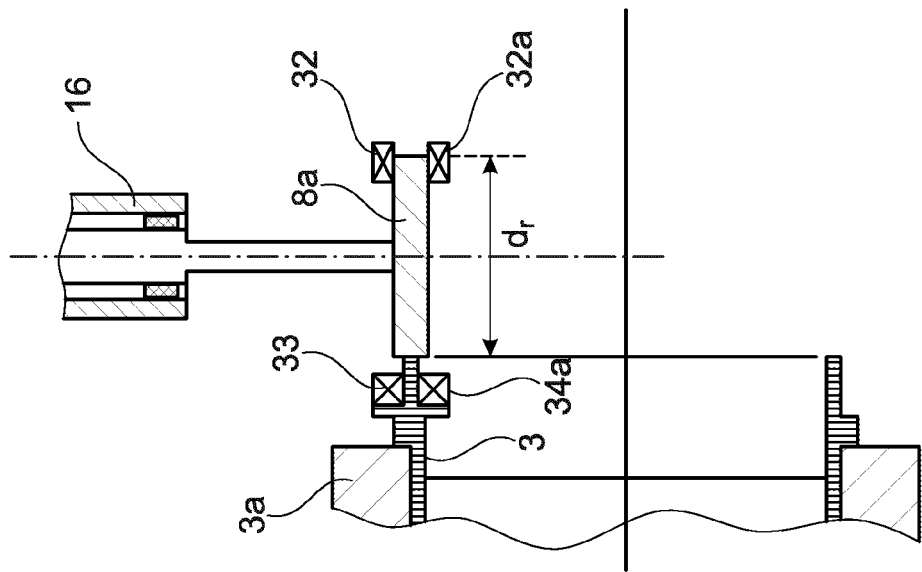
FIG. 6: shows a friction-wheel drive.

FIG. 6 shows an alternative to the toothed-wheel drive of the motor sensor through the use of a friction wheel, which generates less noise.

It is the object of the motor angle sensor to output an angle-proportional signal relating to the piston position, and also to control the commutation of the windings.

As is known, the friction-wheel drive 8a exhibits a small degree of slippage, in particular during acceleration and braking of the motor. Therefore, the friction wheel cams 32 are provided which, in one angle segment, engage into the counterpart cams on the rotor 33. Said counterpart cams are connected directly to the rotor or may be connected to the rotor 3 by means of a plastics part. The friction-wheel drive is mounted in the piston housing 16 and is not specifically described here. The friction-wheel drive has a flexible shaft which generates a preload for generating a friction force.

Figure 6A:
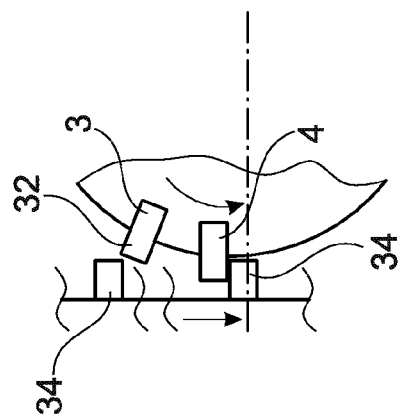
FIGS. 6a/b: shows alignment cams.

FIG. 6a shows the lower of the cams 34 and 32a facing toward the rotor axis, which cams, in the position shown, can enter into engagement if a small degree of slippage is to be corrected. Two positions are illustrated, 3 before and 4 upon engagement.

Figure 6B:
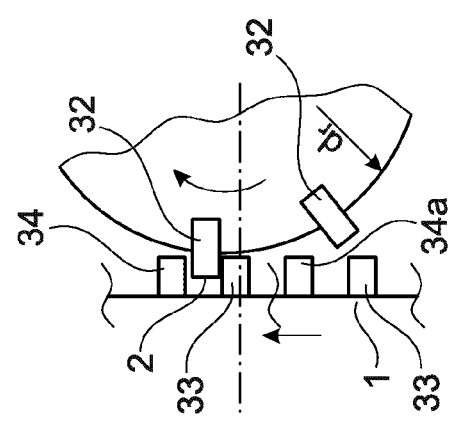
FIGS. 6c and 6d: show further possible designs of the embodiment as per FIG. 1.

FIG. 6b shows the corresponding positions 1 and 2 in the other direction of rotation. In the view from above, it is possible to see the upper cams 33 and lower cams 34a. The cams are shown here in principle but have a toothed-wheel-like form corresponding to the rolling movement. The alignment or slippage correction may primarily also occur upon the reversal of direction; in this way, the precision requirement for the engagement by the cams is made more expedient.

The arrangement of the cams may optionally also be configured such that the friction wheel is attached not between the cams but above or below the cams, which facilitates the installation process.

Figure 6C:
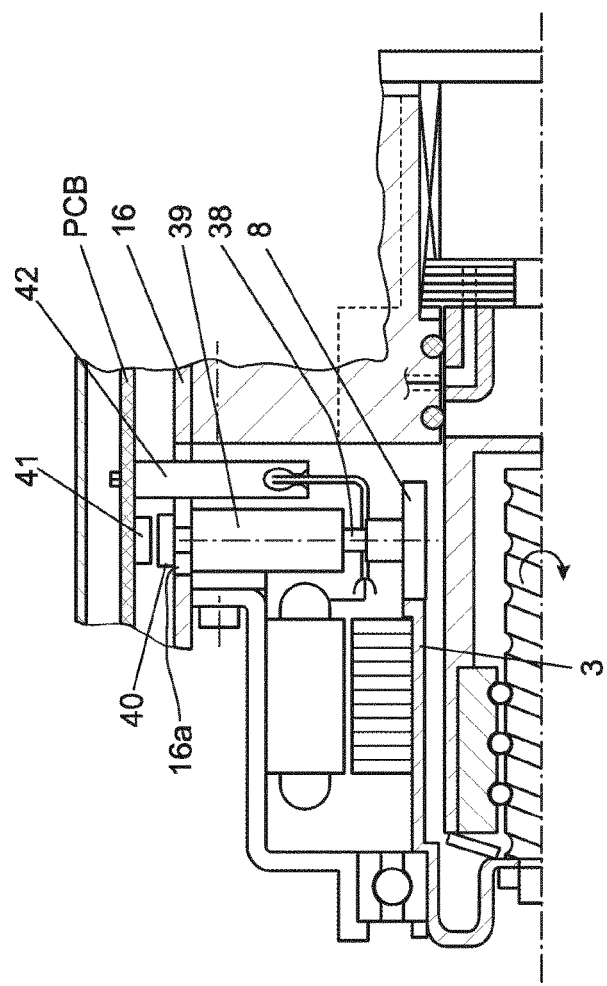

FIG. 6c shows a more detailed configuration of the helical gear mechanism according to the invention with a toothed-wheel drive 8 for the motor sensor or rotational angle sensor as per FIG. 1. The rotor 3 has a toothing which meshes with a toothed wheel 8. Here, for example, spur wheels or bevel wheels may be chosen. It is also possible, for example, for an involute or cycloidal toothing to be chosen, wherein the toothed wheels are preferably manufactured from a noise-optimized materials and/or have a corresponding coating. The drive for the sensor target 40 has a bearing shaft 38 and a bearing arrangement 39, wherein the bearing arrangement 39 may preferably be connected to the piston housing 16. The bearing shaft 38 extends through the passage opening 16a of the piston housing 16, such that the target 40 which is connected rotationally conjointly to the bearing shaft 38 is arranged on that side of the piston housing 16 which faces toward the circuit board PCB. The sensor element 41 is arranged on the circuit board PCB and is connected to an evaluation circuit and detects the rotation of the target 40.

Figure 6D:
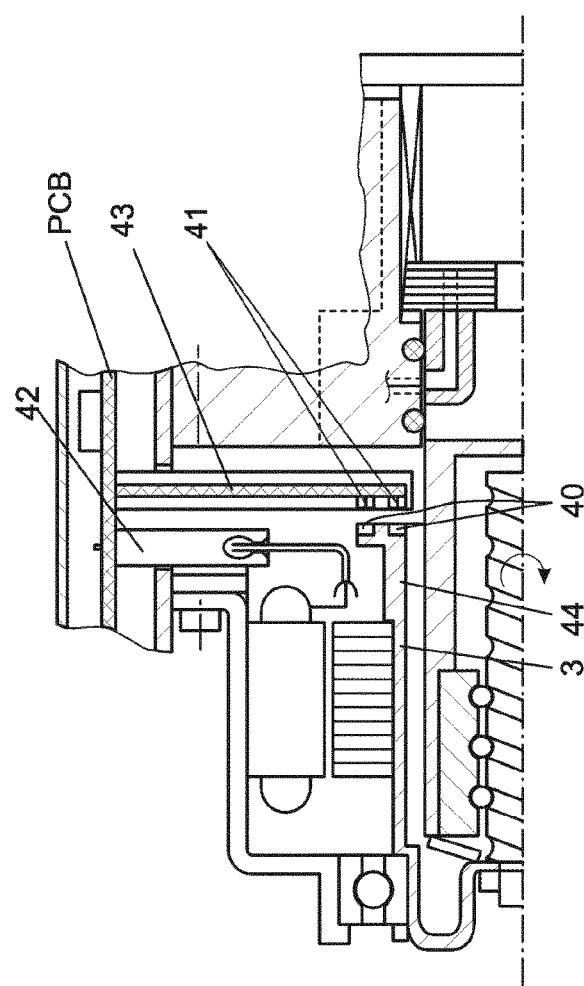

FIG. 6d shows a further possible embodiment of the sensor drive and sensor element. The sensor is in the form of a segment sensor, wherein multiple sensor elements 41 are arranged on one angle segment, which sensor elements are arranged on and fastened to an electrically conductive carrier 43, for example in the form of a leadframe or a circuit board. The face end of the rotor 3 bears or forms a pole wheel 44, on which multiple targets 40 are arranged so as to be distributed over the circumference of said pole wheel at one or more radii.

FIG. 7 shows a further possible embodiment, in which a rotor R is connected to the input of a planetary gear mechanism G and the planet carrier is connected to a transmitter 3' and drives the latter. The transmitter 3' is rotatably mounted on the housing by means of the first bearing L1 and has a resilient region FE which is arranged between bearing L1 and the input of the helical gear mechanism in the form of the spindle S. The remaining configuration may in this case correspond to the embodiments described above, that is to say the rotation-preventing securing means VS and the second bearing L2 may be formed either separately or jointly.

The structural unit is closed off by means of a motor encapsulation. The illustration shows an external-rotor motor, which may alternatively also be designed as an internal-rotor motor. These types of construction give rise, owing to the large radius of the rotor, to a high torque, such that the motor can be dimensioned to be small, or else the piston can be dimensioned to be relatively large with a short stroke.

FIG. 7a shows an alternative embodiment with a spur-gear mechanism in the case of which the rotor acts with pinion Ri on an intermediate toothed wheel ZR, which is mounted on the bearing carrier for L1 and engages on the internally toothed wheel I-Rad, which is connected to the transmitter 3'. With the larger rotor diameter, it is hereby possible to realize an adequate transmission ratio with a low motor torque.

The particle scrapers PS, illustrated and described in FIGS. 1 and 2 may self-evidently likewise be provided in the helical gear mechanisms illustrated and described in FIGS. 3, 4, 5 and 7.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE DESIGNATIONS

1 Motor housing
2 Stator
3 Rotor
3' Transmitter
3a Rotor stator
3w1 Wall
3w2 Wall
3w3 Wall
4 Ball-screw drive
5 Adjustment element/piston
5e End region of the adjustment element 5
6 Support of rotation-preventing securing means VS
7 Flange with support
8 Toothed gear drive of the motor sensor (rotational angle sensor)
8a Friction-wheel drive
9 Motor fastening
10 Nut for the fastening of the motor to spindle
11 Stop ring
12 Connection to reservoir VB
13 Pressure connector
14 Two-part rotor (alternative)
15 1st roller with needle bearing and bearing pin
15a 2nd roller with needle bearing and bearing pin
15b 3rd roller with needle bearing and bearing pin
16 Piston housing
16a Passage opening through the piston housing 16
17 Coupling piece
18 Double-stroke piston
19 Profiled rod
20 Bearing piece
21 Slide ring 22 Oldham coupling piece
23 Adapter
24 Drive shaft
25 Ball bearing
26 Ring
27 Disk spring
28 Securing ring
29 Measurement peg
30 Measurement sensor
31 Knurled wheel
32 Cam on friction wheel
33 Cam r on rotor
34 Cam l on rotor
35 Carrier part for particle scraper PS,
36 Closure means, in particular sealing cap
38 Bearing shaft
39 Bearing arrangement
40 Target
41 Sensor element
42 Plug connector/contacting means from winding to circuit board PCB
43 Sensor carrier
44 Pole wheel
A1, A2 Pressure chambers
L1 Motor bearing
L2 2nd bearing on rotation-preventing securing means VS
L3 Bearing for rotor R
S Spindle
SM Spindle nut
VS Rotation-preventing securing means
D1 Seal 1
D2 Seal 2
D3 Seal 3
Dr Throttle
FE Spring element
G Gear mechanism
HL1 Channel
HL2 Further channel with throttle
VB Reservoir
$S_D$ Clearance of piston with respect to seal
$F_{U1}$ Circumferential force corresponding to motor Md
$F_{U2}$ Support of the circumferential force
FS Cutout
AD Autonomous driving
FO Fail operational
PCB Circuit board
$PS_t$ Particle scraper
R Rotor
V Infeed valves into hydraulic circuit
SV Suction valve
SL Breather hole
ES Input of the helical gear mechanism (either spindle or spindle nut)
KO Coupling piece
PCB Circuit board

What is claimed is:

1. An electric-motor-driven helical gear mechanism for driving an adjustment element comprising an actuator or a piston of a piston-cylinder unit, including:
   an electric drive; and
   a helical gear mechanism,
   wherein the adjustment element is movable back and forth along an axis by means of the electric drive and the helical gear mechanism,
   wherein the electric drive includes a rotor or a transmitter that is driven by a drive mechanism, wherein the rotor or transmitter is mounted rotatably in a housing by means of a first bearing and is fixedly connected to or formed integrally with an input of the helical gear mechanism,
   wherein an output of the helical gear mechanism is connected to or formed integrally with the adjustment element, and further including
   a rotation-preventing securing means configured to prevent a rotation of the adjustment element in a circumferential direction about the axis,
   wherein the rotation-preventing securing means is arranged in or on an end region of the adjustment element, or wherein the end region is part of the rotation-preventing securing means, wherein the end region is a region of the adjustment element facing away from the helical gear mechanism,
   and/or,
   wherein, between the first bearing and the adjustment element, the helical gear mechanism and/or at least a part of the adjustment element are/is, at least in one region, formed to be transversely elastic with respect to the axis, wherein the at least one region includes a spring element or an otherwise elastic region.

2. The electric-motor-driven helical gear mechanism as claimed in claim 1, wherein, there is arranged, in a region of the rotation-preventing securing means, a radial slide bearing configured to support radial forces, or wherein the rotation-preventing securing means is or forms a radial slide bearing.

3. The electric-motor-driven helical gear mechanism as claimed in claim 1, wherein the helical gear mechanism comprises a spindle nut and a spindle and is connected only: (a) to the rotor or to the transmitter and (b) to the adjustment element.

4. The electric-motor-driven helical gear mechanism as claimed in claim 1, wherein the first bearing is arranged between a part of the rotor that bears a rotor winding and/or permanent magnets and the input of the helical gear mechanism.

5. The electric-motor-driven helical gear mechanism as claimed in claim 2, wherein there is no further bearing configured to radially support the rotor or transmitter and the helical gear mechanism between the first bearing and the end region or between the first bearing and the radial slide bearing.

6. The electric-motor-driven helical gear mechanism as claimed in claim 1, wherein the rotor or the transmitter, at least in a region between the first bearing and the input of the helical gear mechanism, has a spring element or an elastic region having an elasticity that is higher than an elasticity of rotating parts of the helical gear mechanism or is such that the elasticity of the elastic region permits a greater deviation than a deviation of the rotating parts from the central axis.

7. The electric-motor-driven helical gear mechanism as claimed in claim 1, wherein between the helical gear mechanism and the adjustment element, there is arranged a spring element or a resiliently elastic region, the elasticity of which is higher than the elasticity of rotating parts of the helical gear mechanism or is such that the elasticity of the elastic region permits a greater deviation than a deviation of the rotating parts from the central axis, and/or wherein the helical gear mechanism is elastic or flexible transversely with respect to its axis of rotation.

8. The electric-motor-driven helical gear mechanism as claimed in claim 1, wherein either the input of the helical gear mechanism is the spindle nut and the output of the helical gear mechanism is the spindle, or
the input of the helical gear mechanism is the spindle and the output of the helical gear mechanism is the spindle nut.

9. The electric-motor-driven helical gear mechanism as claimed in claim 1, wherein the rotor or transmitter is of double-walled form in cross section in a region from the first bearing to the input of the helical gear mechanism, wherein the two walls forming the double-walled form are connected to one another via a wall portion which is of U-shaped cross section.

10. The electric-motor-driven helical gear mechanism as claimed in claim 1, wherein the adjustment element is configured to slide with an end region in a cylindrical guide, wherein an outer radius of said adjustment element is, at least in subregions of an outer wall of said adjusting element, formed such that the end region slides with a sliding fit in the guide and forms a radial slide bearing, and any remaining part of the adjustment element has an outer diameter or an outer contour which is smaller than an outer diameter or outer contour required for a sliding fit.

11. The electric-motor-driven helical gear mechanism as claimed in claim 10, wherein the cylindrical guide has at least one inwardly pointing projection, in the form of an axially extending web, and/or at least one recess, in particular in the form of one or more grooves, which interacts in each case with a groove or a recess, respectively, in the end region of the adjustment element, or of a part arranged on the end region of the adjustment element, in order to form the rotation-preventing securing means.

12. The electric-motor-driven helical gear mechanism as claimed in claim 11, wherein the axially extending web is formed by a segment-shaped part which is fastened to an inner wall of the cylindrical guide.

13. The electric-motor-driven helical gear mechanism as claimed in claim 10, wherein the cylindrical guide has axially running guide surfaces, and wherein the end region of the adjustment element has at least one guide surface, wherein at least one rotatably mounted rolling part is configured to roll on the guide surfaces and, together with these guide surfaces, forms the rotation-preventing securing means, wherein the adjustment element slides at least with a part of the outer wall of the end region on an inner wall of the cylindrical guide with a sliding fit, so as to form a radial slide bearing, wherein, in particular, at least one of the rolling parts transmits circumferential forces and at least one of the rolling parts transmits radial forces.

14. The electric-motor-driven helical gear mechanism as claimed in claim 1, wherein the rotation-preventing securing means is formed by a recess in the end region of the adjustment element and by an engagement part which engages with the adjustment element, wherein the engagement part is mounted rotationally fixedly on a housing of the adjustment element and is secured against rotation in a circumferential direction about the axis by positive locking, wherein either
the end region has an outer diameter which is configured such that the end region can slide in an axial direction with a sliding fit in a guide or a cylinder, or else
the end region has an outer diameter which is smaller than an outer diameter required for a sliding fit, and wherein the engagement part lies in the recess with a sliding fit and forms a slide bearing.

15. The electric-motor-driven helical gear mechanism as claimed in claim 14, wherein the end region, a positive-locking part and the engagement part form an Oldham coupling.

16. The electric-motor-driven helical gear mechanism as claimed in claim 1, wherein the adjustment element is a piston of a piston-cylinder unit, and wherein at least one piston seal is arranged in the cylinder or the piston of the piston-cylinder unit in an axial direction between the helical gear mechanism and the rotation-preventing securing means, in order to seal off a first pressure chamber, wherein, in a region of the at least one piston seal, an outer diameter of the piston is smaller, by a clearance, than an inner diameter of the cylinder, wherein the clearance is between 0.1 mm and 5 mm.

17. The electric-motor-driven helical gear mechanism as claimed in claim 16, wherein a sliding fit of the rotation-preventing securing means and the piston outer diameter and also the inner diameter of the cylinder are configured such that an outer wall of the piston does not make contact at least in a region of the region of the cylinder in which the at least one piston seal is arranged.

18. The electric-motor-driven helical gear mechanism as claimed in claim 1, wherein the adjustment element has a region, an outer diameter of which is smaller than a sliding fit inner diameter of a surrounding cylinder, wherein the region extends from the end region of the adjustment element to an opposite end of the adjustment element.

19. The electric-motor-driven helical gear mechanism as claimed in claim 1, wherein the rotor or transmitter is fastened at an end side to a bearing journal of a spindle of the helical gear mechanism by means of a sliding fit or by means of an interference fit by means of a threaded nut.

20. The electric-motor-driven helical gear mechanism as claimed in claim 1, wherein the adjustment element is a piston of a piston-cylinder unit, and wherein the piston is a single-stroke piston, which delimits only a single pressure chamber, or is a double-stroke piston, which separates two pressure chambers from one another.

21. The electric-motor-driven helical gear mechanism as claimed in claim 20, wherein, in the case of a single-stroke piston, the rotation-preventing securing means simultaneously forms a second bearing, and wherein, in the case of a double-stroke piston, either the rotation-preventing securing means simultaneously forms the second bearing or the rotation-preventing securing means and the second bearing are formed separately.

22. The electric-motor-driven helical gear mechanism as claimed in claim 16, wherein the at least one seal comprises at least two seals, and wherein a channel between the at least two seals opens into cylinder interior space which is connected to a reservoir.

23. The electric-motor-driven helical gear mechanism as claimed in claim 22, wherein an additional seal is provided which is arranged in parallel with respect to one of the at least two seals, wherein a further channel opens into a cylinder interior space between the additional seal and the one of the at least two seals, which cylinder interior space is likewise connected to the reservoir, wherein a throttle is arranged in said further channel.

24. The electric-motor-driven helical gear mechanism as claimed in claim 1, wherein a stop element is provided to restrict relative movement in a stroke end region, during the retraction of the adjustment element, between a spindle and spindle nut, wherein the stop element is arranged on the spindle.

25. The electric-motor-driven helical gear mechanism as claimed in claim 1, wherein a housing, in the form of a flange piece, which accommodates a bearing arrangement and/or support of the rotation-preventing securing means, is fastened to a piston housing, wherein the flange piece has a cylinder bore which engages in the housing with a bore.

26. The electric-motor-driven helical gear mechanism as claimed in claim 1, wherein said helical gear mechanism is configured to adjust a piston, by which a pressure can be maintained, built up and/or dissipated in at least one pressure chamber, or hydraulic circuits connected to the at least one pressure chamber.

27. The electric-motor-driven helical gear mechanism as claimed in claim 1, wherein a friction wheel serves for the drive of a motor sensor or element, wherein the friction wheel is formed with an alignment cam or a tooth.

28. The electric-motor-driven helical gear mechanism as claimed in claim 1, wherein the rotor sets at least one sensor target in rotation via a gear mechanism, wherein the rotation is detected by a sensor element.

29. The electric-motor-driven helical gear mechanism as claimed in claim 28, wherein the gear mechanism has bevel gears, spur gears and/or a special toothing with an involute or cycloidal toothing.

30. The electric-motor-driven helical gear mechanism as claimed in claim 29, wherein, in the case in which the gear mechanism has the special toothing, the resulting specially-toothed gear mechanism has toothed gears that are composed of a low-noise material and/or have a low-noise coating.

31. The electric-motor-driven helical gear mechanism as claimed in claim 1, wherein at least one sensor target is arranged directly on the rotor or on a pole wheel which is arranged rotationally conjointly on the rotor.

32. The electric-motor-driven helical gear mechanism as claimed in claim 31, wherein either multiple sensor elements are arranged in a distributed manner on one angle segment or over the circumference (360°) of the rotor or pole wheel, and/or are arranged in a distributed manner at one or more radii.

33. The electric-motor-driven helical gear mechanism as claimed in claim 1, further including a planetary or spur-gear gear mechanism arranged between the transmitter and a rotor.

34. The electric-motor-driven helical gear mechanism as claimed in claim 28, wherein the rotor is mounted on the housing by means of at least one further bearing.

35. The electric-motor-driven helical gear mechanism as claimed in claim 1, further including at least one protective device for sealing and preventing ingress of dirt, wherein the at least one protective device is arranged between the rotor on one side and (a) a part that is fixed with respect to the housing or (b) the adjustment element, and/or is arranged between a spindle of the helical gear mechanism at one side and the rotor, a spindle nut or the adjustment element at a second side.

36. An installation device for an electric-motor-driven helical gear mechanism as claimed in claim 1, the installation device including an installation device housing, a ball bearing, a preload, and means for radial alignment,
wherein the installation device is configured to be mounted on and/or fastened to a housing of the electric-motor-driven helical gear mechanism, wherein the installation device, by way of the installation device housing, is configured to engage around and to lie against a region of the housing of the electric-motor-driven helical gear mechanism that holds the first bearing,
wherein said installation device, by way of the ball bearing and the preload, is configured to preload the first bearing via the rotor (3), and
wherein the means for radial alignment is configured to radially align either:
the input of the helical gear mechanism and thus to bend the rotor such that an axis of rotation of the helical gear mechanism is in alignment with the axis of the adjustment element and/or of the rotation-preventing securing means, or
the adjustment element in a piston housing.

37. The installation device as claimed in claim 36, where a radial centering and axial movement with measurement of friction forces on the rotation-preventing securing means or of the adjustment element or piston by means of a torque measurement is performed by the installation device.

38. The installation device as claimed in claim 36, wherein, with prior ascertainment of a clearance between the rotation-preventing securing means and a guide thereof, in the form of a bore, by means of the installation device at a measurement peg thereof, the installation device is enabled to determine a further clearance in the X and Y directions transversely with respect to the axis between a spindle and a spindle nut, wherein the spindle is rotated for this purpose, wherein, subsequently, with knowledge of the further clearance, fixing of a motor housing of the electric-motor-driven helical gear mechanism with a correspondingly reversed offset on a piston housing is performed for the purposes of eliminating the further clearance.

39. The installation device for an electric-motor-driven helical gear mechanism as claimed in claim 36, wherein a pressure is exerted on the adjustment element using compressed air, in order to achieve clearance-free alignment of a spindle and a spindle nut of the helical gear mechanism.

* * * * *